C. B. CLARK.
Improvement in Mop-Heads.
No. 128,711.  Patented July 9. 1872.
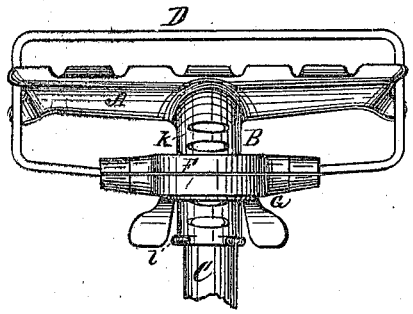
Fig. 1.
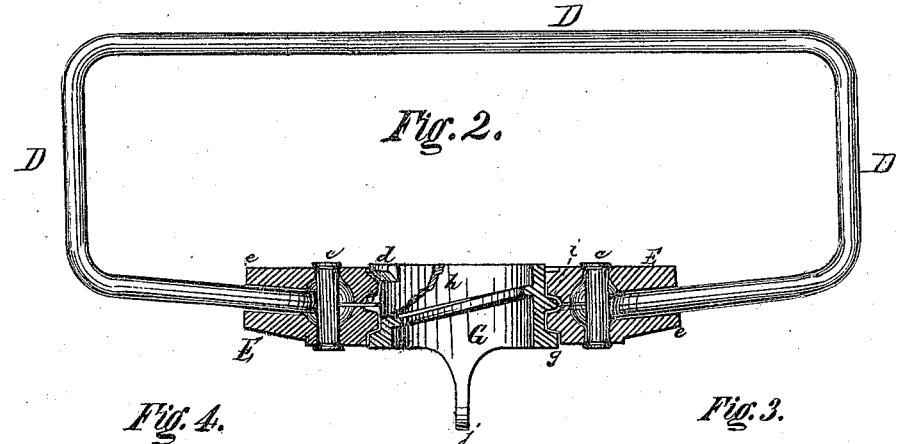
Fig. 2.
Fig. 4.
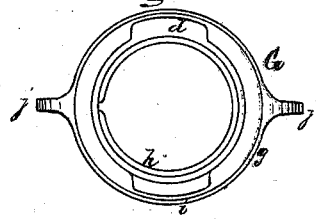
Fig. 3.
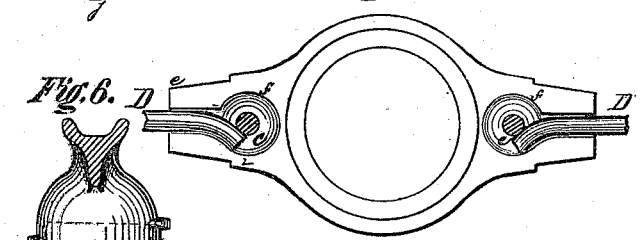
Fig. 5.
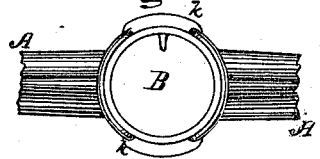
Fig. 6.
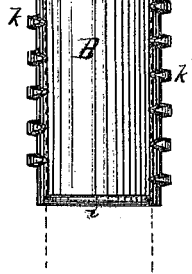
Witnesses:
K. N. Jones.
Wm. F. McNamara.
Inventor:
Charles B. Clark
Per Burke & Fraser, Attys.
AM. PHOTO-LITHOGRAPHIC CO. N.Y. (OSBORNE'S PROCESS.)

UNITED STATES PATENT OFFICE.

CHARLES B. CLARK, OF BUFFALO, NEW YORK.

IMPROVEMENT IN MOP-HEADS.

Specification forming part of Letters Patent No. 128,711, dated July 9, 1872.

SPECIFICATION.

*To all whom it may concern:*

Be it known that I, CHARLES B. CLARK, of the city of Buffalo, in the county of Erie and State of New York, have invented an Improvement in Mop-Heads, of which the following is a description:

It is the object of my invention to so construct a mop-head that the wire which forms the movable jaw is secured to the cast-iron collar by the same rivets which serve to unite the parts of the collar and form a facile and reliable connection, and to enable the shank of the solid head to be cast with less expense in molding than when made, as ordinarily done, with a screw-thread; and it consists in connecting the ends of the wire movable jaw by bending them laterally and receiving the bent portion in a socket surrounding the rivet, which secures the two parts of the collar together, and in such a manner that the rivet and the walls of the socket prevent the wire from being moved in or out; in providing the collar with a central annular groove, in combination with the double spurs on the nut, for insuring a secure and equal connection; and in providing the shank of the fixed head with a double series of teeth upon its sides, which engage with an inclined feather of the nut, said teeth enabling the shank to be molded more easily and perfectly from the parting of the sand in the mold being on the plane portion of the cylinder.

Figure 1 is a general plan view of my improved mop-head of reduced size. Fig. 2 shows the movable jaws D, collar, and nut, the two latter being in section on the plane of the wire frame. Fig. 3 is a plan of the interior of one-half of the collar, showing the bent ends of the wire frame D. Fig. 4 is an end view of the nut G. Fig. 5 is an end view of the hollow shank of the fixed jaw. Fig. 6 is a side view of the same, the jaw being shown in section.

The fixed jaw A and shank B (which may be cast together or separately, as preferred) are attached to the handle C of the mop. The movable jaw D is a wire frame of the usual shape, and is carried by the traversing-collar E, which surrounds the shank B. This collar is formed in two longitudinal halves, with arms $e\ e$ at opposite sides for riveting and connecting with the jaw D, the ends of which are laid in coincident grooves in the faces, which are in line with the rivet-holes. These holes are surrounded in each half by an annular recess, $f\ f$, Fig. 3, and the ends of the wire are bent so as to pass the rivets $c$ and lie in these recesses, where they are firmly held when the collar is riveted, the rivet preventing their being forced in and the recess preventing their being withdrawn. One part of the collar is cast with annular grooves $a\ b$ on the face of its aperture, and the hollow nut G provided with spurs, which engage in these grooves, the one, $d$, fitting the groove $a$ and the other, $i$, arranged on the opposite side of the nut, and in a position to enter the central annular groove $b$. These allow the nut to turn freely and have an equal bearing on both sides, which insures a steady movement of the jaw and uniform pressure on the cloth when clamped between the jaws. An outside flange, $g$, gives increased strength and conceals the joint between the nut and collar. From the collar being divided flatwise the grooves $a\ b$ may be molded in one part easily and without coring, and the rivet-holes also cast, whereby all drilling is obviated. The nut is provided with an inclined feather, $h$, and the shank B has on its opposite sides, by preference, two series of teeth, $k\ k$, with which said feather engages, and, owing to its inclination, causes the nut, when rotated by the thumb-pieces $j\ j$, to traverse the shank endwise, carrying with the collar E and movable jaw. By turning the nut in one direction the cloth is clamped between the jaws A and D, and released by turning in the opposite direction. The teeth $k$ of the shank B are broadest at their base, and rounded or pointed at their extremities, being of a form easily molded and cast, and their arrangement in a series on opposite sides of the shank enables them to be molded from a solid pattern, which, having a plain cylindrical surface between the teeth, is easily withdrawn without breaking the sand, materially reducing the cost of manufacture over those shanks which are cast with a screw-thread upon them, and, owing to this facility of molding, a more perfect casting can be produced.

A bead or rim, $l$, may terminate the shank, both for ornamental finish and to increase the strength of the socket, having openings corresponding with the series of teeth to admit of the feather $h$ being passed on or off.

I claim as my invention—

1. The central annular groove $b$, formed by uniting the two parts E of the movable jaw D, for operating in connection with the nut G, as set forth.

2. The wire or movable jaw D provided with the bent ends, in combination with the rivets $c\ c$ and the annular recesses $f\ f$ in the plates E E, as set forth.

3. The nut G, formed with the opposite spurs $d\ i$, in combination with the grooves $a\ b$ of the collar, constructed and operating substantially as set forth.

4. In a mop-head, I claim the shank B provided with the double series of rack-teeth $k\ k$, and operating in connection with the inclined feather $h$ of the nut G, as and for the purpose set forth.

In witness whereof I have hereunto signed my name in the presence of two subscribing witnesses.

CHAS. B. CLARK.

Witnesses:
E. L. FERGUSON,
H. R. CLARK.